United States Patent [19]

Lindner et al.

[11] Patent Number: 4,885,209

[45] Date of Patent: Dec. 5, 1989

[54] THERMOPLASTIC SILICON RUBBER GRAFT POLYMERS (II)

[75] Inventors: Christian Lindner, Cologne; Herbert Eichenauer, Dormagen; Dieter Wittmann, Krefeld; Volker Damrath, Burscheid, all of Fed. Rep. of Germany

[73] Assignee: Bayer Aktiengesellschaft, Leverkusen, Fed. Rep. of Germany

[21] Appl. No.: 204,022

[22] Filed: Jun. 8, 1988

[30] Foreign Application Priority Data

Jun. 20, 1987 [DE] Fed. Rep. of Germany ....... 3720475

[51] Int. Cl.[4] .................................................. B32B 7/04
[52] U.S. Cl. ..................................... 428/420; 525/63; 525/64; 427/221; 427/222; 428/407
[58] Field of Search ................ 428/407, 420; 427/221, 427/222; 525/63, 64

[56] References Cited

U.S. PATENT DOCUMENTS

| | | | |
|---|---|---|---|
| 4,375,532 | 3/1983 | Baer | 428/407 |
| 4,748,215 | 5/1988 | Lindner et al. | 524/457 |
| 4,798,869 | 1/1989 | Sturm et al. | 525/305 |

Primary Examiner—Melvyn I. Marquis
Attorney, Agent, or Firm—Connolly and Hutz

[57] ABSTRACT

The invention relates to thermoplastic particulate graft polymers of a rubber (AB), consisting of a core (A) of rubber-like polymer of olefinically unsaturated monomers having softening temperatures (glass temperatures) below 0° C. and a shell (B) of organopolysiloxane, and a polymer (C) of at least one ethylenically unsaturated monomer grafted into the rubber (AB) and to their use, optionally in admixture with brittle thermoplastic vinyl resins, as thermoplastic molding compositions.

5 Claims, No Drawings

THERMOPLASTIC SILICON RUBBER GRAFT POLYMERS (II)

This invention relates to thermoplastic graft polymers of special silicone rubbers as the graft base and polymers of resin-forming monomers as the graft overlay and to their use as thermoplastic molding compositions.

Graft polymers on silicone rubbers as the graft base are known in principle (cf. DE-OS Nos. 2 539 572 and DE-OS 2 421 288).

It has been found that particulate graft polymers on silicone rubbers show particularly advantageous properties as thermoplastic molding compositions when the silicone rubber has a core/shell structure with a rubber of olefinically unsaturated monomers as the core.

Accordingly, the present invention relates to thermoplastic particulate graft polymers of a rubber (AB), consisting of a core (A) of rubber-like polymer of olefinically unsaturated monomers having softening temperatures (glass temperatures) below 0° C. and a shell (B) of organopolysiloxane, and a polymer (C) of at least one ethylenically unsaturated monomer (graft superstrate) grafted onto the rubber (AB) (graft base).

The ratio by weight of the core (A) to the shell (B) is preferably from 0.1:99.9 to 90:10 and more preferably from 10:90 to 50:50. The graft polymers according to the invention have average particle diameters ($d_{50}$) of from 0.05 to 10 $\mu$m, preferably from 0.1 to 2 $\mu$m and more preferably from 0.1 to 1 $\mu$m.

Preferred graft polymers contain the graft superstrate (C) in quantities of 20 to 90% by weight, preferably in quantities of 30 to 80% by weight and more preferably in quantities of 45 to 75% by weight, based on the graft polymer.

The cores (A) of rubber-like polymer having a softening temperature (glass temperature) below 0° C., preferably below −b 20° C. and more preferably below −40° C. themselves have average particle diameters ($d_{50}$) of from 0.05 to 2 $\mu$m and preferably from 0.09 to 0.5 $\mu$m. They may be uncrosslinked, partially crosslinked or highly crosslinked. Particles of at least partially crosslinked polymer are preferred. The core material (A) is a rubber-like homopolymer or interpolymer of at least one olefinically unsaturated monomer, more especially a diene, such as butadiene, isoprene, chloroprene, an olefin, such as ethylene, a vinyl ester, such as vinyl acetate and vinylpropionate, and an alkylacrylate, such as ethyl, butyl, hexylacrylate, i.e. monomers which are capable of forming a rubber-like polymer, optionally even together with other monomers, such as styrene, acrylonitrile, alkyl methacrylate, acrylic acid, methacrylic acid, acrylamides, $\alpha$-methyl styrenes. Preferred core materials are olefin rubbers and alkylacrylate rubbers.

The constituent material of the shell (B) is a homopolymer or interpolymer of organopolysiloxanes, essentially comprising units corresponding to the following general formula

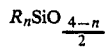 (I)

in which R is a monofunctional organic radical and n is a number having an average value of 1 to less than 3.

For example, R may be a monofunctional hydrocarbon radical, for example a $C_1$-$C_{18}$ alkyl radical, for example methyl, ethyl, or a $C_6$-$C_{10}$ acryl radical, such as phenyl. R may also be monofunctional hydrocarbon radical reactive to radicals, more especially vinyl, allyl, chloroalkyl, mercaptoalkyl, acryloxypropyl. Preferably, at least 80% of all the substituents R are methyl groups.

The graft superstrates (C) present in the graft polymers according to the invention are polymers of $\alpha,\beta$-unsaturated monomers, preferably vinyl monomers. Suitable monomers are, for example, styrene, $\alpha$-methyl styrene, p-methyl styrene, halogen styrene, acrylonitrile, methacrylonitrile, vinyl halides (vinyl chloride), maleic imides, maleic acid derivatives, vinyl acetate, vinylpropionate, alkyl (meth) acrylates (containing up to 10 carbon atoms in the alcohol part), vinyl ethers, conjugated dienes, such as butadiene, chloroprene, and $\alpha$-olefins, such as ethylene, propene, butene. Particularly preferred monomers are styrene, acrylonitrile, propene, ethylene and butene.

The graft superstrates (C) may be homopolymers or copolymers of at least two of the above-mentioned monomers.

The graft superstrate (C) is at least partly graft polymerized onto the silicone rubber, i.e. chemically attached thereto. In preferred graft polymers, more than 50% by weight of the graft overlay is chemically attached (graft polymerized) to the graft base.

The graft polymers according to the invention may be prepared as follows:

In a first step, an emulsion of the core material (A) is prepared in a known manner by the dispersion polymerization of the monomer or corresponding monomers. The monomers are preferably polymerized in aqueous emulsion in the presence of surfactants and, optionally, initiators. The particle diameter of the polymers may be adjusted by variation of the polymerization conditions. The emulsion polymerization is normally carried out at 10° to 100° C. Preferred emulsions of the core material (A) have a pH value below 7 and are prepared with anionic emulsifiers, more especially salts of sulfonic acids or organic sulfonates. The particle diameter of the latices obtained may be adjusted in particular through the monomer/emulsifier/water ratio. If the cores (A) are to be at least partially crosslinked, the monomers forming the core material may be polymerized in the presence of polyfunctional vinyl or allyl monomers, more especially in quantities of up to 5% by weight, based on the monomers. Suitable crosslinking monomers are, for example, divinylbenzene, bisacrylates, bisacrylamides, vinylacrylate, triallylcyanurate, isocyanurate, phosphate, citrate, butadiene, isoprene.

In a second step, the organopolysiloxane for the shell (B) is prepared by emulsion polymerization in the presence of the emulsion of the core material (A) of the first step by dispersing low molecular weight organosiloxanes in the latex from the first step and polymerizing the resulting dispersion (optionally in the presence of emulsifier in the quantity required for a stable emulsion and a catalyst). The coarsely dispersed organosiloxane does not have to be mechanically emulsified using technical aids, for example in high-speed stirrers (Ultraturrax), colloid mills or high-pressure homogenizers, before the polymerization. Instead, emulsion and polymerization are preferably carried out at the same time. In this way, the organopolysiloxane formed is surprisingly polymerized onto the core material (A) prepared in the first step.

The reaction temperature may be increased to around 40 to 100° C. to increase the polymerization velocity.

The particle diameters of the polymers of the second step may also be adjusted by variation of the polymerization conditions, for example by the use of non-ionic co-emulsifiers, by adjustment of the emulsifier-to-organosiloxane ratio and by the use of core materials having suitable particle diameters.

Known compounds may be used as the organosiloxanes for the production of (B), including above all cyclic organosiloxane oligomers, for example octamethyl cyclotetrasiloxane and decamethyl cyclopeptasiloxane. Alkoxysilanes and alkoxysiloxanes containing 1 to 4 carbon atoms in the alkoxy groups are also suitable. Examples of suitable alkoxysilanes are methyl triethoxysilane, 3-aminopropyl trimethoxysilane and 3-mercaptopropyl methyl dimethoxysilane.

Polysiloxanes, more especially α,Ω-polysiloxane diols, having a molecular wieght of 2,000 to 5,000 and a velocity of 50 to 150 mPa.s of 25° C. are also suitable for the second step of the process.

The organopolysiloxane of the shell (B) may be partly crosslinked. Branches or crosslinks may be incorporated by the addition of, for example, tetraethoxysilane or of a silane corresponding to the following general formula

$$R\ Si\ X_3 \qquad (II)$$

in which X is a hydrolyzable group, more especially the alkoxy radical, and R is as defined above, R is preferably methyl and phenyl. However, crosslinking may also occur if, for example, vinyl and mercapto groups used at the same time react with one another in the emulsion polymerization of the siloxane constituents. In that case, there is no need to add an external crosslinking agent.

The emulsifiers used are known non-ionic and/or anionic emulsifiers.

Examples of nonionic emulsifiers are adducts of ethylene oxide with compounds containing acidic hydrogen, such as fatty alcohols and fatty acids. The HLB value of the emulsifiers should be in the range which promotes the formation of oil-in-water emulsions. In general, emulsifiers having an HLB value of $\geqq 10$ are used. (HLB=hydrophilic-lipophilic balance, c.f. McCutchan, Detergents and Emulsifiers, Allured Publ. Corp. 1971). Suitable nonionic emulsifiers are, for example, POE (3)-lauryl alcohol, POE (20)-oleyl alcohol, POE (7)-nonylphenol or POE (10)-stearate. (The notation POE (3)-lauryl alcohol e.g. means that 3 units of ethylene oxide "POE" are added onto 1 molecule of lauryl alcohol, the number 3 representing an average value; the same applies to the other numbers.)

Suitable anionic emulsifiers are the alkali salts of fatty acids or the alkali, alkaline earth or amine salts of organic sulfonic acids, more especially alkylarylsulfonic acids. Examples include the sodium salt of dodecyl benzensulfonic acid and laurylsulfonic acid. Mixtures of the non-ionic emulsifiers and anionic emulsifiers may be used.

Acids, more especially surface-active acids, are used as the catalysts.

Examples of catalysts are sulfonic acid, such as alkylsulfonic acids or alkylarylsulfonic acids, for example dodecyl benzenesulfonic acid. Basically, any acids known as polymerization initiators may be used as catalysts, surfaceactive acids being preferred.

In the polymerization of the shell (B), the formation of new particles must be completely prevented. Accordingly, the emulsifier may only be present in a quantity just sufficient to cover the surface of the particles. The size of the particles may be varied within wide limits according to the conduct of the reaction. If an agglomerated latex is used as the core material (A), large particles which may contain several rubber particles are obtained. The polymerization of the shell (B) may also be conducted in such a way that particles having a core/shell structure and, at the same time, particles of pure organopolysiloxane are formed. According to the invention, it is also possible in special circumstances to use mixtures such as these.

In a third step, the monomers forming the graft superstrate are radically graft polymerized in the presence of the rubber, more especially at a temperature of 40° to 90° C. The graft polymerization may be carried out in suspension, dispersion or emulsion. Continuous or non-continuous emulsion polymerization using radical initiators (from the group comprising peroxides, azo compounds, hydroperoxides, persulfates, perphosphates) and, optionally, anionic emulsifiers, such as carbonium salts, sulfonic acid salts or organic sulfates, is preferred. The graft polymers are formed in high graft yields, i.e. a large part of the overlay polymer (C) formed is chemically attached to, i.e. grafted onto, the silicone rubber. The special rubber base (A+B) eliminates the need for special measures (which provide for high grafting).

The graft polymers thus prepared may be worked up by known methods, for example by coagulation of the latices with electrolytes (salts, acids or mixtures thereof), followed by purification and drying.

The thermoplastic graft polymers according to the invention are distinguished by a number of properties of technical importance to plastics, including ageing stability, thermal stability, particularly during processing into moldings, surface quality of moldings produced therefrom, processibility, toughness at low temperatures and break resistance.

The graft polymer according to the invention may readily be used as a thermoplastic molding composition where its rubber content is no higher than 40% by weight. With higher rubber contents, a rigid resin may be added. Rigid resins are, preferably, styrene/methyl methacrylate/acrylonitrile terpolymers, styrene or α-methyl styrene/acrylonitrile copolymers, styrene/acrylonitrile/acrylate terpolymers, methyl methacrylate homopolymers or copolymers, styrene/maleic anhydride copolymers, styrene/methyl methacrylate/maleic anhydride terpolymers or mixtures of these resins.

The graft polymers according to the invention may also be mixed with known rubber-modified plastics, for example with ABS plastics, or with acrylate-rubber-modified resins ("ASA resins"). It is thus possible to improve the ageing resistance and electrostatic properties of ABS without adversely affecting the mechanical properties or to improve the mechanical properties of ASA resins and the surface quality of moldings produced therefrom.

The molding compositions according to the invention can contain dyes and pigments, light and heat stabilizers, plasticizers, blowing agents and organic or inorganic fillers in granule, powder or fiber form. They may be molded, for example, by injection molding or by extrusion and are suitable for molded articles of all kinds which are required to be weather-resistant and impact-resistant. For example, they may form the outer layer of a laminate of several different polymers.

Parts in the following working examples are parts by weight.

EXAMPLES

1. Preparation of a core material (A)

10,300 parts water, 5 parts Na salt of $C_{14}$–$C_{18}$ alkyl sulfonic acids, 800 parts n-butyl acrylate and 4 parts triallylcyanurate are introduced into a reactor. After heating to 70° C., polymerization is initiated by the addition with stirring of a solution of 30 parts potassium peroxodisulfate in 1,000 parts water. The following solutions are then introduced into the reactor over a period of 5 hours at 70° C.:

| | | |
|---|---|---|
| Solution 1: | 9150 | parts n-butylacrylate |
| | 46 | parts triallylcyanurate |
| Solution 2: | 7000 | parts water |
| | 200 | parts Na salt of $C_{14}$–$C_{18}$ alkylsulfonic acids |

Polymerization is then completed over a period of 4 hours at 70° C. The latex obtained has a solids content of 35.9%, a pH value of 3.2 and an average particle diameter ($d_{50}$ value) of 0.18 μm. The polymer is partially crosslinked and has a gel content of 89%, as measured in dimethyl formamide.

2. Preparation of rubber particles (AB)

The following constituents are introduced under nitrogen into a reactor:
 200 parts acrylate latex (1)
 5 parts octamethyl cyclotetrasiloxane The reaction mixture is heated to 85° C. and stirred for 2 hours.

After the addition of a solution of 1.5 parts dodecyl benzenesulfonic acid and 1.5 parts $C_{12}$–$C_{14}$ alkylsulfonic acid sodium salt in 125 parts water, the mixture is stirred for 1 hour at 85° C. A mixture of 95 parts octamethyl cyclotetrasiloxane and 2.5 parts tetramethyl tetravinyl cyclotetrasiloxane is then introduced over a period of 2 hours, polymerization is completed over a period of 24 hours at 80° C. and the stable emulsion formed is cooled to room temperature. It contains the multiphase polymer in a concentration of 36%. The particle diameter ($d_{50}$) is 0.15 μm. The polymer is partially crosslinked and has a gel content of 87%. It consists of 40% acrylate rubber and 60% organopolysiloxane.

3. Graft polymer (AB+C)

The following constituents are introduced into a reactor:
 2089 parts by weight latex (2)
 1070 parts by weight water After initiation with a solution of 7.5 parts by weight potassium peroxodisulfate in 195 parts by weight water at 65° C., the following solutions are uniformly introduce into the reactor over a period of 4 hours:

| | | |
|---|---|---|
| Solution 1: | 540 | parts by weight styrene |
| | 210 | parts by weight acrylonitrile |
| Solution 2: | 375 | parts by weight water |
| | 15 | parts by weight sodium salt of $C_{14}$–$C_{18}$ alkyl sulfonic acids |

Polymerization is then carried out over a period of 4 hours at 65° C. The monomer conversion is more than 98% by weight. A latex having a solids content of approximately 33% by weight is obtained. After coagulation with an aqueous magnesium sulfate solution, filtration and drying in vacuo, the graft polymer is obtained in the form of a white powder.

4. Comparison

4.1 Preparation of a silicone rubber emulsion 38.4 parts by weight octamethyl cyclotetrasiloxane, 1.2 parts by weight tetramethyl tetravinyl cyclotetrasiloxane and 1 part by weight δ-mercaptopropyl methyl dimethoxysilane are stirred with one another. 58.4 parts by weight water are then added over a period of 1 hour with intensive stirring to 0.5 part by weight dodecyl benzenesulfonic acid. The pre-emulsion is homogenized twice at 200 bar in a high-pressure emulsifying machine. Another 0.5 part by weight dodecyl benzenesulfonic acid is then added.

The emulsion is stirred for 2 hours at 85° C. and then for 36 hours at room temperature. After neutralization with 5 N NaOH, a stable emulsion having a solids content of approximately 36% by weight is obtained. The polymer has a gel content of 82% by weight, as measured in toluene, and an average particle diameter ($d_{50}$) of 300 nm.

4.2 Graft polymer

The following constituents are introduced into a reactor:
 2107 parts by weight latex (4.1)
 1073 parts by weight water After initiation with a solution of 7.5 parts by weight potassium peroxydisulfate in 195 parts by weight water, the following solutions are uniformly introduced into the reactor over a period of 4 hours at 65° C.;

| | | |
|---|---|---|
| Solution 1: | 540 | parts by weight styrene |
| | 210 | parts by weight acrylonitrile |
| Solution 2: | 370 | parts by weight water |
| | 15 | parts by weight Na salt of $C_{14}$–$C_{18}$ alkylsulfonic acids |

Polymerization is then carried out over a period of 4 hours at 65° C., giving a latex having a solids content of approximately 33% by weight. After coagulation with an aqueous magnesium sulfate solution, filtration and drying, the graft polymer is obtained in the form of a white powder.

5. Properties of the thermoplasts

The molding compositions shown in Table 1 are prepared by compounding in a BR Banbury mixer (Pomini-Farrel) under the following mixing conditions:
 Melt temperature: 190 to 225° C.
 Mixing times: 1.5 to 2 minutes
 Cycle times: 2 to 4 minutes The mixture drops from the Banbury mixer into a two-roll stand (roll 1 T=160° C., roll 2 T=150° C.), is removed in the form of a ribbon and granulated after cooling.

Standard small test bars are made from the granulate by injection molding at 240° C. and tested by DIN methods.

An ABS graft polymer V of 50% by weight coarse highly crosslinked particulate polybutadiene and 50% by weight SAN polymer, in which the styrene-to-acrylonitrile ratio by weight is 72:28 and which has an average particle diameter ($d_{50}$) of 400 nm, is used for comparison.

The notched impact strength was determined at room temperature ($a_k^{RT}$) and at $-40°$ C. ($a_k^{-40°\,C.}$) in accordance with DIN 53 453 (units: kJ/m$^2$), ball indentation hardness ($H_c$) in accordance with DIN 53 456 (units: N/mm$^2$) and deflection temperature under load (Vicat B) in accordance with DIN 53 460 (units: °C).

TABLE 1

Thermoplastic mixtures

| Example | Graft polymer | (Parts by weight) | Resin | (Parts by weight) |
|---|---|---|---|---|
| 5.1 | 3.1 | (20) | SAN | (80) |
| 5.2 | 3.1 | (30) | SAN | (70) |
| 5.3 | 3.1 | (40) | SAN | (60) |
| 5.4 | 3.1 | (50) | SAN | (50) |
| 5.5 | 4.2 | (20) | SAN | (80) |
| 5.6 | 4.2 | (30) | SAN | (70) |
| 5.7 | 4.2 | (40) | SAN | (60) |
| 5.8 | 4.2 | (50) | SAN | (50) |
| 5.9 | V | (30) | SAN | (70) |
| 5.10 | V | (40) | SAN | (60) |
| 5.11 | V | (50) | SAN | (50) |

SAN = Copolymer of 70% by weight styrene and 30% by weight acrylonotrile having a limiting viscosity number in [η] of 0.72 dl/g (as measured in dimethylformamide at 20° C.)

All products contain 2 parts by weight Pentaerythritol tetrastearate as a lubricant

TABLE 2

| Properties of the molding compositions of Table 1 | | | | |
|---|---|---|---|---|
| Product | $a_k^{RT}$ | $a_k^{-40°\,C.}$ | Hc | Vicat B |
| 5.1 | 14.1 | 4.5 | 122 | 105 |
| 5.2 | 18.0 | 8.0 | 104 | 102 |
| 5.3 | 19.2 | 11.2 | 87 | 99 |
| 5.4 | 20.1 | 12.8 | 69 | 95 |
| 5.5 | 11.2 | 4.0 | 123 | 102 |
| 5.6 | 16.6 | 8.2 | 103 | 100 |
| 5.7 | 18.4 | 10.9 | 97 | 99 |
| 5.8 | 19.9 | 12.9 | 69 | 93 |
| 5.9 | 14.4 | 7.2 | 108 | 99 |
| 5.10 | 14.9 | 11.2 | 90 | 98 |
| 5.11 | 15.8 | 13.1 | 74 | 95 |

We claim:

1. Thermoplastic particulate graft polymers of a substrate rubber (AB), consisting of a core (A) of rubber polymer of olefinically unsaturated monomers having softening temperatures below 0° C. and a shell (B) of organopolysiloxane, and a superstrate polymer (C) of at least one ethylenically unsaturated monomer graft polymerized onto the rubber substrate (AB).

2. Thermoplastic graft polymers according to claim 1 wherein the weight ratio of core A to shell B is 0.1:99.1 to 90:10.

3. Thermoplastic graft polymers according to claim 1 wherein the superstrate is 20 to 90 % by weight of the graft copolymer 4. Thermoplastic graft polymers according to claim 1 wherein (A) is an alkylacrylate rubber.

5. Thermoplastic graft polymers according to claim 1 wherein (c) is a homopolymer or copolymer of ethylene, propylene, butylene, styrene and/or acrylonitrile.

* * * * *